(12) United States Patent
Levy et al.

(10) Patent No.: US 7,628,926 B2
(45) Date of Patent: Dec. 8, 2009

(54) SYSTEM AND METHOD FOR MONITORING WATER TRANSMISSION OF UV LIGHT IN DISINFECTION SYSTEMS

(75) Inventors: Uri Levy, Rehovot (IL); Idan Levin, Yehud (IL); Moshe Ben-David, Tel Aviv (IL); Avi Levin, Yehud (IL)

(73) Assignee: Atlantium Technologies Ltd., Beit Shemesh (IL)

( * ) Notice: Subject to any disclaimer, the term of this patent is extended or adjusted under 35 U.S.C. 154(b) by 0 days.

(21) Appl. No.: 11/976,732

(22) Filed: Oct. 26, 2007

(65) Prior Publication Data

US 2008/0105623 A1    May 8, 2008

Related U.S. Application Data

(60) Provisional application No. 60/854,432, filed on Oct. 26, 2006.

(51) Int. Cl.
*C02F 1/32* (2006.01)
*B01D 35/30* (2006.01)

(52) U.S. Cl. .................... 210/745; 210/94; 210/748; 210/198.1

(58) Field of Classification Search .......... 210/748, 210/739, 745, 94, 198.1; 250/432; 422/186, 422/186.3
See application file for complete search history.

(56) References Cited

U.S. PATENT DOCUMENTS

| 6,299,844 | B1 * | 10/2001 | Tao et al. ............... 422/186 |
| 6,313,468 | B1 * | 11/2001 | Wedekamp ............ 250/373 |
| 6,707,048 | B2 | 3/2004 | Hallett et al. |
| 6,773,608 | B1 | 8/2004 | Hallett et al. |
| 6,791,092 | B2 | 9/2004 | Hamilton |
| 6,972,415 | B2 * | 12/2005 | Schaible et al. ........... 250/436 |

FOREIGN PATENT DOCUMENTS

| JP | 10057954 | | 3/1998 |
| JP | 401299693 A | * | 12/1999 |
| NL | 1003961 C | | 3/2006 |

OTHER PUBLICATIONS

International Search Report for International Application No. PCT/IL2007/001305. Date of Mailing Jun. 12, 2008.

* cited by examiner

*Primary Examiner*—Duane Smith
*Assistant Examiner*—Cameron J Allen
(74) *Attorney, Agent, or Firm*—Pearl Cohen Zedek Latzer, LLP

(57) ABSTRACT

Some demonstrative embodiments of the invention include a system and a method for disinfection of a liquid including monitoring the disinfection process. The system may include a short-path light detector located in proximity to the illumination source to detect the intensity of light emitted from the illumination source at a short distance from the source. The system may include at least one additional long-path light detector located in proximity to the transparent walls of the conduit of liquid to be disinfected that detects light emitted from the illumination source after propagating in the liquid and exiting through the transparent walls.

9 Claims, 5 Drawing Sheets

SYSTEM AND METHOD FOR MONITORING WATER TRANSMISSION OF UV LIGHT IN DISINFECTION SYSTEMS

CROSS REFERENCE TO RELATED APPLICATIONS

This application claims the benefit of U.S. Provisional Application No. 60/854,432, filed on Oct. 26, 2006 which is incorporated in its entirety herein by reference.

BACKGROUND OF THE INVENTION

Ultraviolet (UV) liquid disinfection systems, using UV light source have been long known. The irradiation of the liquid inactivates microorganisms in the liquid, if the irradiation intensity and exposure duration are above a minimum dose level. The disinfection systems may require a reliable monitoring system to allow control and supervision of the disinfection process. Such a monitoring system may include one or more detectors to detect light intensity of light emitted from the UV light source in order to obtain UV light transmission in the liquid. The UV light transmission may then be correlated to the required overall UV dose (often measured in units of milijoules per square centimeter) delivered by the UV disinfection system to water borne harmful microorganisms to ensure disinfection to the required level.

Conventional monitoring systems for UV disinfection systems usually perform off-line UV light transmission measurements on samples of liquid transferred from the disinfection reactor to an external monitoring reactor. Such external systems are expensive, space consuming and complicate the process of disinfection. An internal, reliable, direct real-time measurement of liquid UV light transmission in disinfection systems is highly required.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
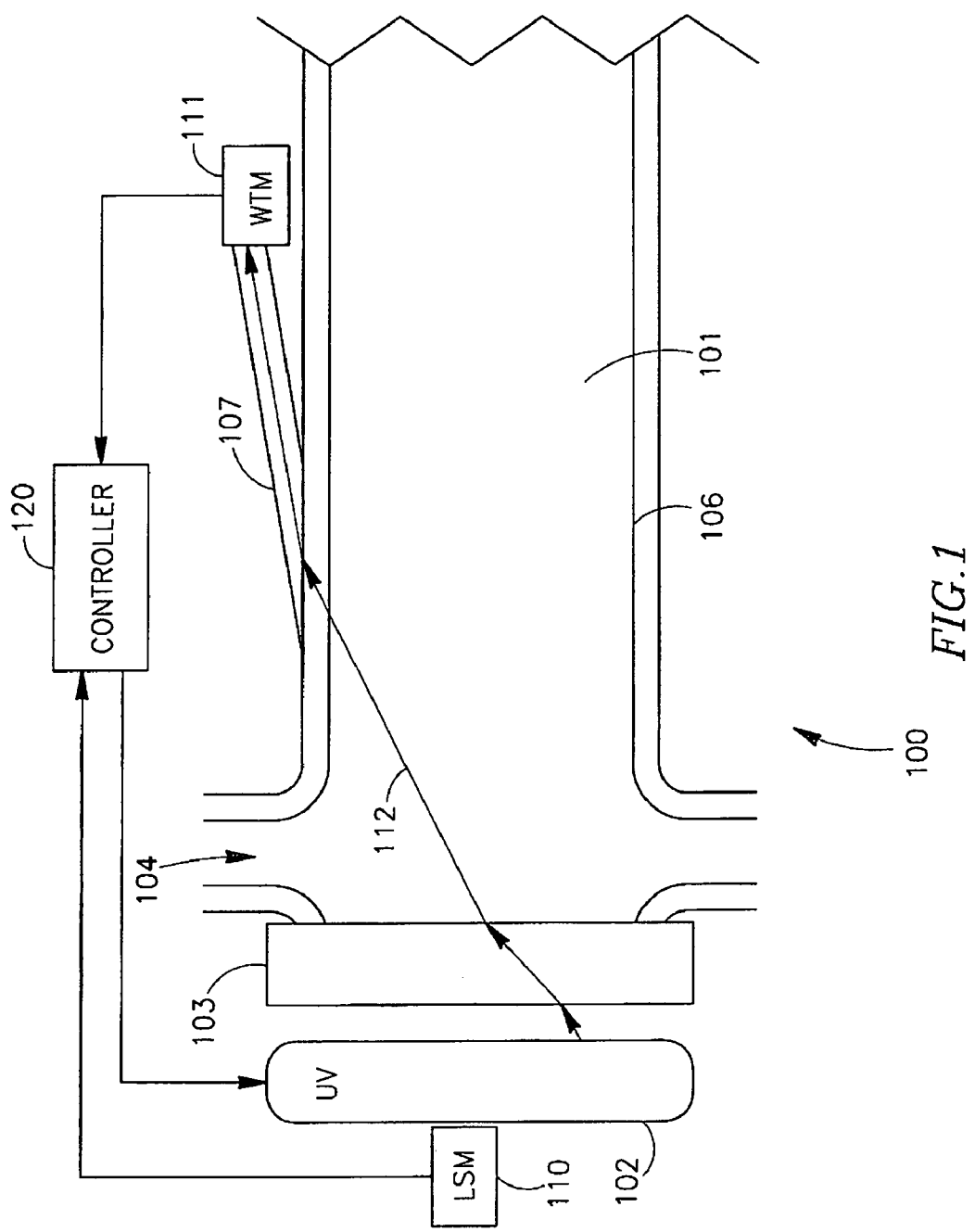
FIG. 1 is a conceptual illustration of an exemplary disinfection system having water transmission monitoring capabilities according to some demonstrative embodiments of the invention.

It will be appreciated that for simplicity and clarity of illustration, elements shown in the drawings have not necessarily been drawn accurately or to scale. For example, the dimensions of some of the elements may be exaggerated relative to other elements for clarity. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Some demonstrative embodiments of the invention include a monitoring system to monitor the process of ultraviolet (UV) disinfection using various UV disinfection systems, as described in detail below.

It will be appreciated that the liquid disinfection process may include inactivation or removal of any organism, bacteria, microorganism, being, creature, microbe, germ, virus, organic contaminator, non-organic contaminator, oxidizable toxic or contaminator; any cumulative noxious species of biological or chemical origin; any oxidizing particle, fragment or element, e.g., Hydrogen peroxide or Titanium dioxide, intended to oxidize a contaminator and/or the like.

In some demonstrative embodiments of the invention, the disinfection system may include a conduit, for example, a reactor, a vessel, a chamber, e.g., an elongated chamber, to carry the liquid. The conduit may have an inlet to receive the liquid and an outlet to discharge the liquid. The system may also include at least one external or liquid immersed illumination source to illuminate the conduit with light. Some demonstrative embodiments of the invention may refer to using ultraviolet (UV) light to disinfect the liquid and/or to oxidize particles within the liquid. However, it will be appreciated by those skilled in the art, that in other embodiments of the invention, light of any other suitable spectrum may be used.

Reference is now made to FIG. 1, which conceptually illustrates an exemplary disinfection system having water transmission monitoring capabilities according to some demonstrative embodiments of the invention. According to some embodiments of the invention, a disinfection system 100 which may be, for example, a hydro-optic reactor may include a conduit 101 to carry flowing liquid to be disinfected and an external illumination source 102 to illuminate the liquid within conduit 101.

Conduit 101 may have an inlet 104 to receive the liquid and an outlet (not shown) to discharge the liquid. Conduit 101 may include walls 106 made, at least partially, of material transparent to UV radiation such as quartz and a window 103 transparent to UV radiation and located proximate to illumination source 102. Conduit 101 may be located inside a protective metal sleeve with an air gap between the conduit and the sleeve (not shown). Although the invention is not limited in this respect, illumination source 102 may generate UV light of a suitable UV spectrum. For example, illumination source 102 may include one or more UV lamps such as for example a low-pressure UV lamp, a medium-pressure UV lamp and/or a microwave-excited UV lamp, as are all known in the art.

Disinfection system 100 may further include a short-path illumination source status detector 110 positioned in proximity to illumination source 102 and referred to herein as lamp status monitor (LSM), one or more long-path illumination source status detectors 111 positioned externally to conduit 101 adjacent to transparent wall 106 and referred to herein as water transmission monitor (WTM) and a field of view (FOV) limiter 107 associated with WTM 111 to reduce the FOV of WTM 111. LSM 110 and WTM 111 may be used for on-line real-time measurements of UV light transmittance of the liquid. The UV light transmittance of the liquid may be calculated from the measurements of the detectors in terms of Ultraviolet Water Transmission (UVT), commonly used in the UV industry and defined as the UV transmittance of a one centimeter water column at 254 nm. System 100 may further include a controller 120 to receive measurement results from WTM 111 and LSM 110 and to monitor the disinfection operation based on the received results.

According to some embodiments of the invention, illumination source 102 may be directed to illuminate the liquid within conduit 101 via window 103 with light having a spatial light intensity distribution. The power of the light produced by illumination source 102 may be detected by LSM 110 and WTM 111. Then, the measurement results may be delivered to a controller and may be used to calculate the real-time UV water transmission (UVT) values. If the calculated UVT values are not within a required range, the controller may adjust operating parameters such as illumination source power, water capacity and others. Additionally or alternatively, the controller may send an alert notification.

It should be understood that LSM 110 may directly detect the UV light emitted from illumination source 102, namely, the light path from illumination source 102 to LSM 110 does not traverse the liquid. Alternatively, the light pass of rays emitted from illumination source 102 and detected by LSM 110 may traverse a short distance in the liquid. In contrast, WTM 111 indirectly detects the UV light emitted from illumination source 102, namely, the light path from illumination source 102 to WTM 111 traverses the liquid on its way and is longer than the light pass of the rays detected by LSM 111.

Although the invention is not limited in this respect, LSM 110 and WTM 111 may include a narrow-band filter centered at a specific wavelength, e.g., 254 nm. For example, a Silicone Photodiode S2684-254 sold by HAMAMATSU, Japan having a sensitivity peak at 254 nm and full width at half maximum (FWHM) of 10 nm may be used. Due to the fact that illumination source 102 is external to conduit 101, LSM 110 may be located adjacent to illumination source 102 and may detect a real-time signal of illumination source 102. For example, this signal may be in a format of 4-20 milliampere, as commonly used in the industry. The signal may be process to extract the output power and/or output voltage of the illumination source. Such a direct real-time detection in contrast to reliance on the characteristics given by the provider, cannot be performed in conventional disinfecting systems having lamps immersed in the liquid where the light path from the lamp to the detector must traverse the liquid and accordingly the output power of the lamp cannot be measured independently.

In some embodiments of the invention, the liquid flowing in conduit 101 may act as a waveguide and at least part of the radiation, may be totally-internally reflected (TIR) at the interface of the transparent conduit and air surrounding it. In such a waveguide configuration, the transparent walls 106 may enable measuring the intensity of rays 112 which traverse via the liquid at WTM 111. While most UV rays in the waveguide configuration may be trapped in the water-waveguide, rays 112 with an axial angle above a critical angle may escape the waveguide and propagate in a shallow angle near the transparent walls 106. Optionally, in some embodiments of the invention, a mirror may be positioned at a suitable location in order to direct light through the water in axial angles larger than the critical angle. Further, FOV limiter 107 may reduce the range of FOV to approximately ±3°. The intensity of the rays escaping from conduit 101 may be measured by WTM 111, for example, for the purpose of monitoring the water transmission of UV light in disinfection system 100.

Referring to the long-path illumination source status detectors, according to embodiments of the invention, WTM 111 may be placed adjacent to conduit wall 106, in relative proximity to illumination source 102. WTM 111 may be positioned facing illumination source 102 to allow at least a portion of the light emitted from illumination source 102 in the form of well-defined high-angle rays 112 to reach the field of view (FOV) of WTM 111 after traversing the liquid within conduit 101 in-real time during the disinfection process.

The physical location of WTM 111 may be in an acute angle relative to conduit wall 106, for example nearly parallel to conduit 101. WTM 111 may include, be connected to or be positioned behind FOV limiter 107, which may be used as a "tunnel" for light rays of a narrow cone of angles emanating from illumination source 102 to be detected by WTM 111. FOV limiter 107 may be useful in accurately defining the length of light pass through the liquid, which is required for calculation of the absorption coefficient.

Although in the exemplary illustration of FIG. 1, one conduit, one illumination source, one LSM detector and one WTM detector are shown, it should be understood to a person skilled in art that the invention is not limited in this respect and according to embodiments of the present invention, the disinfection system may include any suitable numbers of conduits, illumination sources, LSM detectors and WTM detectors. In addition any other conduit-lamp-detectors assembly may be used, for example, as depicted in FIG. 2, according to another embodiment of the present invention, two conduits and two WTM detectors are illustrated.

Figure 2:
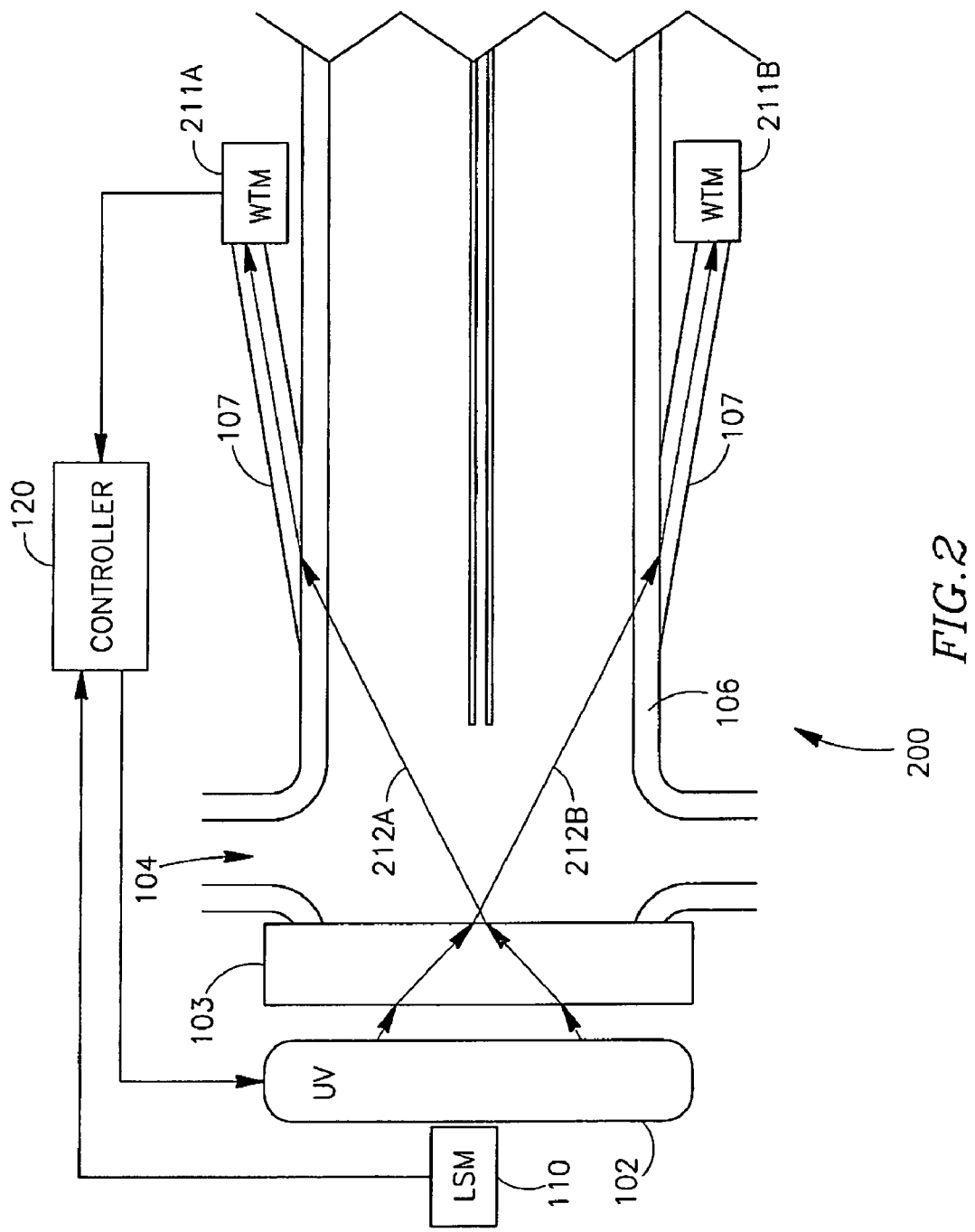
FIG. 2 is an exemplary 2-pipe disinfection system having water transmission monitoring capabilities according to some demonstrative embodiments of the invention.

Reference is additionally made to FIG. 2, which conceptually illustrates an exemplary 2-pipe disinfection system having water transmission monitoring capabilities according to other demonstrative embodiments of the invention. A disinfection system 200 may include two parallel conduits 201A and 201B and two WTM's 211A and 211B, each for detecting UV light emitted from illumination source 102. As depicted at FIG. 2, some well-defined high-angle rays 212A may emanate from illumination source 102, traverse via the liquid and reach FOV limiter 207 of WTM 211A while other well-defined high-angle rays 212B may travel a mirror-image trace 212B and reach FOV limiter 207 of WTM 211B.

The signal detected by WTM 111 or 211 may be a low noise stable signal as a result of the physical location of the detector relative to walls 106 and inlet 104. The physical location of both the direct detector LSM and the indirect detector WTM may result in a high accuracy and high reliability water transmission monitoring system. For example, the described monitoring system may measure water internal transmission with an accuracy of about 1% to 1 [cm] over a large range of water transmission values.

According to some embodiments of the invention, controller 107 may receive measurement results from WTM 111 and LSM 110 in real-time from measurements done within the disinfection reactor during the disinfection operation and may process the results based on the following model. The basic equation used for UVT measurements reads as follows:

$$P(L,\lambda)=P(0,\lambda)\cdot e^{-\alpha(\lambda)\cdot L} \quad (1)$$

where $P(L,\lambda)$ represents the power in Watts of light rays at a wavelength $\lambda$, reaching a detector, after traveling a distance $L$ in the liquid under measurement. Although the invention is not limited in respect, in disinfection system 100, P(L,λ) may be measured by WTM 111 which may detect power of light rays emanating from light source 102 and reaching WTM 111 after traveling through the liquid and through FOV limiter 107.

P(0,λ) denotes the power of light rays at wavelength λ at distance 0 from the illumination source, namely the power of the emitted light. Although the invention is not limited in this respect, in disinfector system 100, the power of the light source P(0,λ) may be measured by LSM 110 which may monitor the power of light source 102 at all times.

L denotes the distance, measured in [cm] that was traveled by light rays within the liquid under measurement. The length of light path through liquid, which is dependent on the physical location of WTM 111 in disinfector 100 is known by design and may be provided to controller 107. α(λ) denotes the absorption constant of the water under measurement measured, for example in [1/cm]. It is clear from equation (1) that once P(0,λ) and P(L,λ) are measured by LSM 110 and WSM 111 and as L is known for a given system, then α(λ) may be easily determined from equation (1).

By determining α(λ) from equation (1), the UV water transmission, namely, UVT(λ) may be calculated by equation (2) that reads as follows:

$$UVT(\lambda) = 100 \cdot e^{-\alpha(\lambda) \cdot 1} \quad (2)$$

where UVT(λ) is measured in [%/cm].

According to some embodiments of the invention, the wavelength range of interest for UVT may be around 254 nm, which is the wavelength where mercury atoms have a very strong emission line. Therefore, UVT measurements in disinfection system 100 may be centered at a wavelength of 254 nm.

According to some embodiments of the invention, LSM 110 and WTM 111 may detect a voltage signal which may be delivered to controller 107 for processing, for example, by a software tool. For example, detected voltage signals may be translated by a signal processing software tool to weighted average transmission values.

Although the invention is not limited in this regard, the processing procedure of the detected signal may include the use of the following equation connecting the voltage signal detected by WTM 111 at time "t" to the water UV transmission at time "t":

$$UVT(t) = UVT_0 \cdot \left\{ \left(\frac{V_{LS0}}{V_{LS}(t)}\right) \cdot \left(\frac{V_{WTM}(t)}{V_{WTM0}}\right) \right\}^{(1/L)} \quad (3)$$

where $UVT_0$ represents the UV water transmission, measured in [%/cm] at time t=0 as determined by an external calibrated spectrophotometer (not shown), for example, a spectrophotometer with a quartz-cell length of 10 cm. $V_{LS0}$ represents the voltage detected by LSM 110 at time t=0. $V_{LS}(t)$ represents the voltage detected by LSM 110 at time "t". $V_{WTM0}$ represents the voltage detected by WTM 111 at time t=0. $V_{WTM}(t)$ represents the voltage detected by WTM 111 at time "t"; and L represents the distance traveled by light rays in the water under measurement in conduit 101, measured in [cm].

Although embodiments of the present invention is not limited in this respect, water transmission monitoring systems described with reference to embodiments of the present invention may be embedded in a plurality of disinfection systems having a plurality of physical designs.

Figure 3:
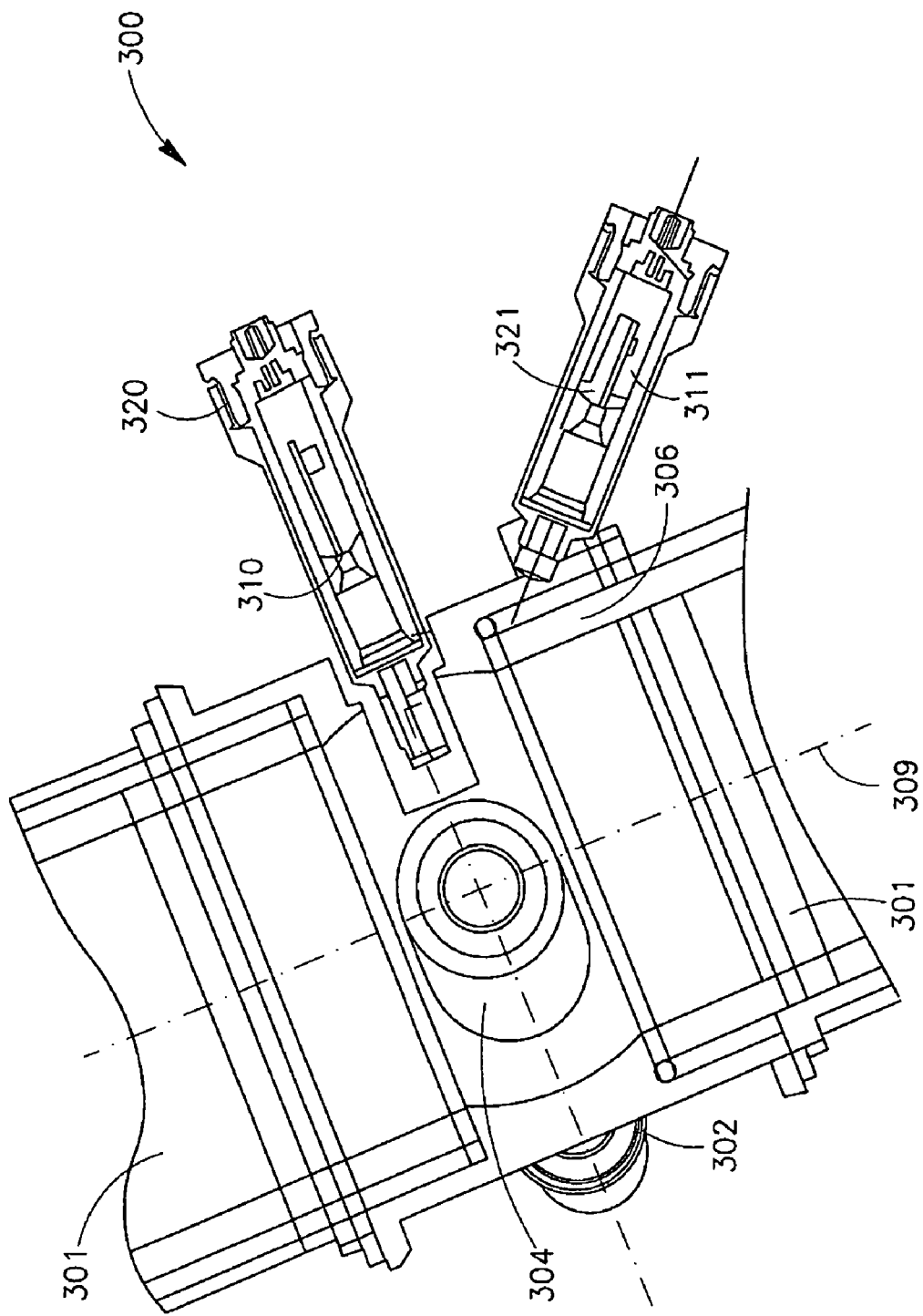
FIGS. 3 and 4 conceptually illustrate two cross sectional views of an exemplary disinfection system having water transmission monitoring capabilities according to some demonstrative embodiments of the invention.
Figure 4:
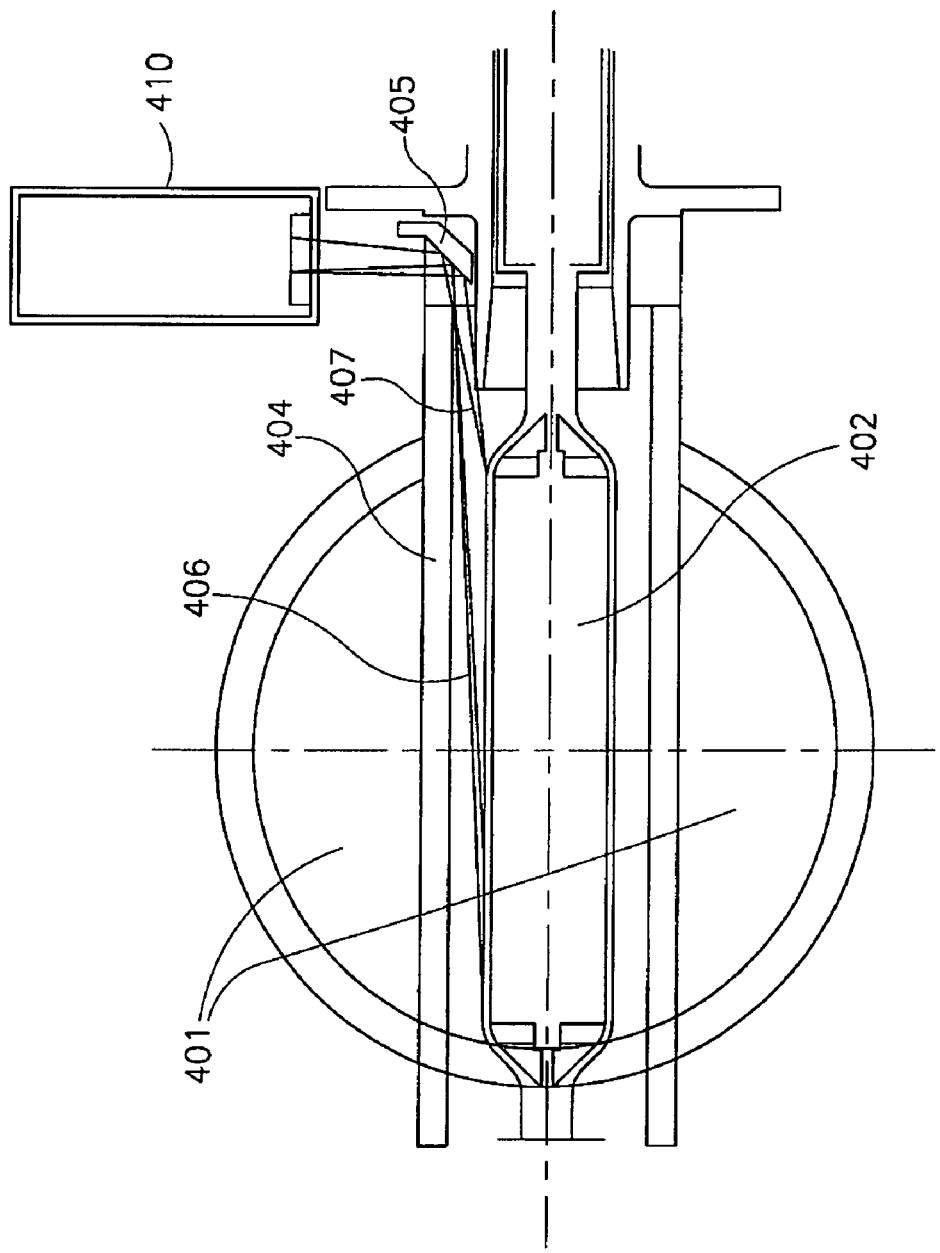

Reference is now made to FIGS. 3 and 4, which conceptually illustrate two cross sectional views of an exemplary disinfection system having water transmission monitoring capabilities according to some demonstrative embodiments of the invention. In this exemplary system, an illumination source may be located inside a transparent sleeve positioned substantially perpendicular to the longitudinal axis of symmetry of the conduit and to the direction of flow of the liquid. A disinfection system 300 may include a conduit 301 to carry liquid to be disinfected, one or more substantially UV-transparent sleeves 304 positioned within conduit 301 substantially perpendicular to its longitudinal axis of symmetry 309 and to the direction of flow of the liquid and one or more UV-radiation sources 302, each positioned within a respective sleeve 304. Radiation source 302 may illuminate the liquid to be disinfected when flowing in the conduit. In this configuration, the liquid within conduit 301 may act as a waveguide and at least part of the radiation, for example, at least half of the emitted UV intensity, may be totally-internally reflected at the interface of the UV-transparent conduit 301 and the air surrounding it.

Disinfection system 300 may further include one or more short-path illumination source status detectors (LSM's) 310, each directed at a respective radiation source 302. Additionally, disinfection system 300 may include one or more long-path illumination source status detectors (WTM's) 311 to detect and monitor the UV light transmittance of the liquid as described above. According to some embodiments of the present invention, the power of the light produced by radiation source 302 may be extracted from the signals detected by LSM 310 and WTM 311 and may be used to calculate the liquid transmission of light in conduit 301 as described in detail above.

Although the present invention is not limited in this respect, due to the fact that radiation source 302 is placed within sleeve 304, LSM 310 may be located in a sensor holder 320 connected to sleeve 304 and may detect a real-time signal of radiation source 302 from which the output power may be extracted. As depicted at FIG. 4, light rays emitted from the entire length of radiation source 302 within the field of view that is confined by rays 406 and 407 may arrive at a mirror 405 to be reflected from the mirror to LSM 310. The positioning of mirror 405 at a specific location may enable LSM 310 to detect ray lights emitted from the entire length of radiation source 302. The detected light rays may be detected by LSM 310 as emitted from radiation source 302, without crossing the liquid flowing in conduit 301. Alternatively, the positioning of LSM 310 relative to radiation source 302 may cause the light pass of rays emitted from illumination source detected by LSM 310 to cross a short pass in the liquid.

WTM 311 may be placed adjacent to the conduit walls 306 within a sensor holder 321, in relative proximity to radiation source 302. WTM 311 may be positioned facing illumination source 302 to enable at least well-defined high-angle rays emanating from radiation source 302 to traverse the water and reach the FOV of WTM 311. The rays detected by WTM 311 are the light rays which are not reflected back into the liquid.

Figure 5:
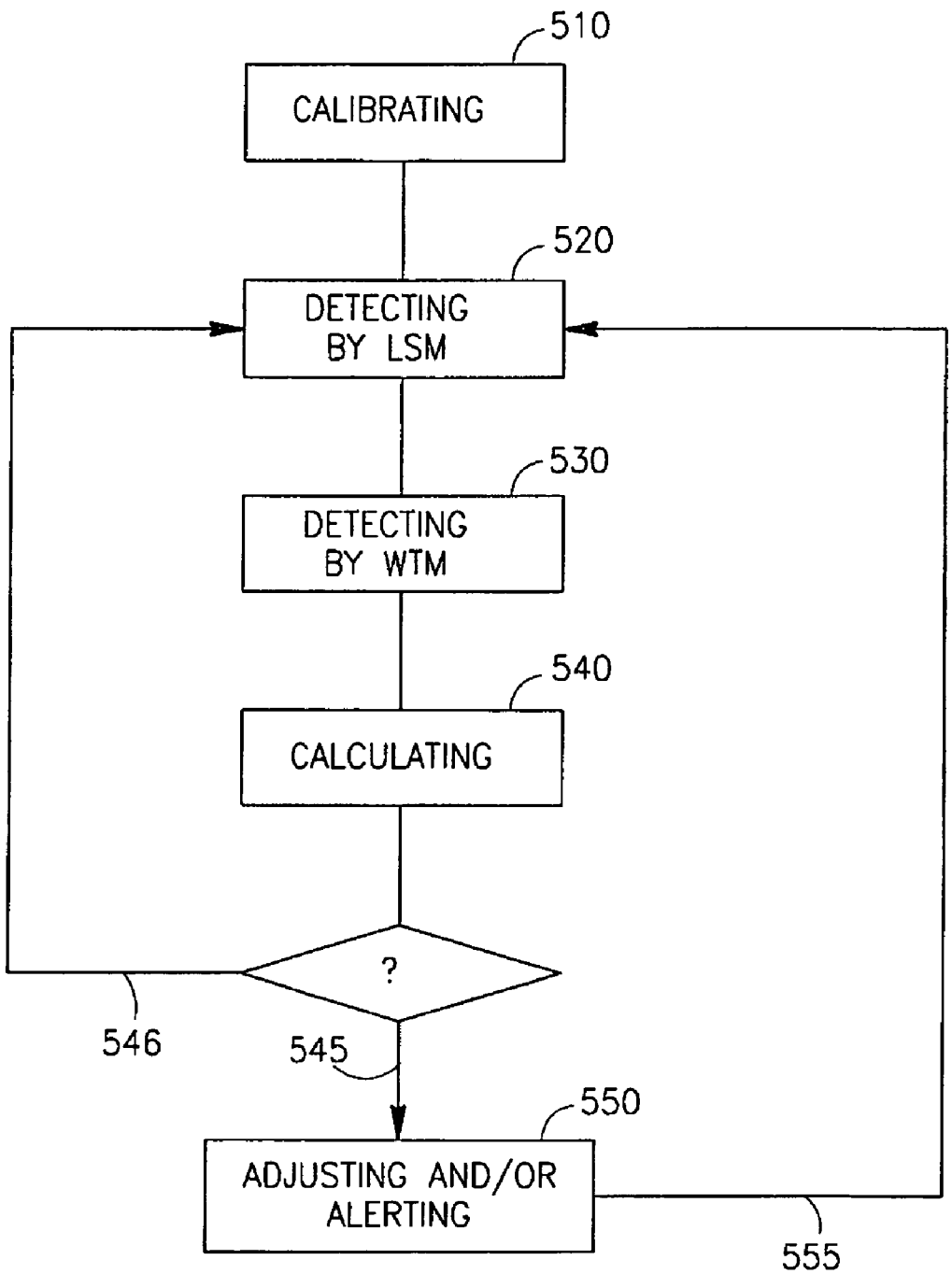
FIG. 5 is a flowchart of a method for monitoring the operation of the disinfection system according to some embodiments of the invention.

Reference is now made to FIG. 5 which is a flowchart of a method for monitoring the operation of the disinfection system according to some embodiments of the invention. Operations of the method may be implemented, for example, by elements of system 100 of FIG. 1, and/or by other suitable units, devices, and/or systems. As indicated at box 510, the method may include calibrating the monitoring system, for example, systems 100 (of FIG. 1) and system 300 (of FIG. 3). The calibration procedure indicated at box 510 may include calibration of indirect detectors, for example, water transmission monitors 211A and 211B (of FIG. 2) and calibration of direct detectors, for example, light transmission monitor 110 (of FIG. 1). The calibration may be performed once, at time t=0 and may be used to calibrate, adjust and attune the water transmission monitoring system. The calibration may include detecting $V_{LS0}$ by the direct detector and $V_{WTM0}$ by the indirect detector and storing those values at a dedicated storage of a system controller. The calibration procedure may include taking at time t=0 a sample of the water, determining the water transmission by, for example, an external calibrated spectrophotometer and storing the measured value at the dedicated storage.

As indicated at box 520, the method may include detecting light emitted from illumination source, for example, illumination source 102 (of FIG. 1) by a direct detector, for example, LSM 110 (of FIG. 1). Detecting the light may be performed in real-time, namely every predetermined period of time and may be performed directly, e.g., the light path from the illumination source to the direct detector may not traverse the liquid to be disinfected.

As indicated at box 530, the method may include detecting light emitted from illumination source, for example, illumination source 102 (of FIG. 1) by an indirect detector, for example, WTM 111 (of FIG. 1). Detecting the light may be performed in real-time, namely every predetermined period of time and may be performed indirectly, e.g., the light path from the illumination source to the indirect detector may traverse the liquid to be disinfected on its way.

As indicated at box 540, the method may include calculating water UV transmission by a system controller, for example, controller 120 (of FIG. 1). A controller may receive the detected values from the direct light detector and form the indirect light detector and may calculate UVT(t) on a periodic manner by using equation (3).

As indicted by arrow 546, if the calculated value, namely the real-time UV water transmission value is below a certain threshold or is not within a required range monitoring may proceed as described in box 520.

As indicted by arrow 545, if the calculated value, namely the real-time UV water transmission value reaches a certain value or is not within a required range the method may include adjusting operating parameters such as illumination source power, water capacity and others and/or alerting by sending system alert notifications as indicted at box 550.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A liquid disinfection system having built-in monitoring capabilities, the system comprising:
   a conduit to carry flowing liquid to be disinfected, wherein the conduit comprises an inlet to receive the liquid, an outlet to discharge the liquid and walls transparent to ultraviolet radiation;
   an illumination source located within a transparent sleeve, said transparent sleeve immersed in the flowing liquid to disinfect the liquid when passing through the conduit;
   a first light detector located externally to the conduit to detect light emitted by the illumination source, such that a first light path between the first light detector and the illumination source does not traverse the liquid; and
   a second light detector located externally to the conduit to detect light emitted from the illumination source such that a second light path between the second light detector and the illumination source traverses the liquid and exits through the walls of the conduit, the second light path being longer than the first light path.

2. The system of claim 1 comprising:
   a field of view limiter external to the conduit the conduit to limit the angle range of rays capable of being detected by the second light detector and to enable determination of a single length value defining a portion of the second light path within the liquid.

3. The system of claim 2 comprising:
   a controller to receive a first detected value from the first detector and a second detected value from the second detector and to calculate on-line liquid transmission of the light based on the single length value, the first detected value and the second detected value.

4. The system of claim 3 wherein the liquid transmission of the light is calculated based on the following formula:

$$UVT(t) = UVT_0 \cdot \left\{ \left( \frac{V_{LS0}}{V_{LS}(t)} \right) \cdot \left( \frac{V_{WTM}(t)}{V_{WTM0}} \right) \right\}^{(1/L)}$$

wherein $UVT_0$ represents UV water transmission, measured in percentage per unit length at time t=0, $V_{LS0}$ represents voltage detected by the first light detector at time t=0, $V_{LS}(t)$ represents the first detected value defined as voltage detected the by first light detector light at time "t", $V_{WTM\ 0}$ represents voltage detected by the second light detector at time t=0, $V_{WTM}(t)$ represents the second detected value defined as voltage detected by the second light detector at time "t" and L represents the length value defined as the distance traveled by light rays in the liquid.

5. The system of claim 3, wherein the controller is to adjust operating parameters based on the liquid transmission of the light.

6. The system of claim 1, wherein the illumination source is positioned in a transparent sleeve substantially perpendicular to the direction of the flowing liquid within the conduit.

7. The system of claim 6 comprising:
   a mirror positioned in proximity to the first light detector to reflect light emitted from the illumination source into the first light detector.

8. A method for real-time water transmission monitoring in a liquid disinfection system, the method comprising:
   passing liquid through a conduit having an inlet to receive the liquid, an outlet to discharge the liquid and transparent walls;
   disinfecting the liquid within the conduit by exposing the liquid to ultraviolet light emitted from an illumination source;
   detecting by a first detector located externally to the conduit, in real-time, a first portion of the light emitted from the illumination source, wherein said illumination source is located within a transparent sleeve and said transparent sleeve is immersed in the liquid and a first light path between the first light detector and the illumination source does not traverse the liquid;
   detecting by a second detector located externally to the conduit, in real-time, a second portion of the light emitted from the illumination source, wherein the second portion of the light propagated in the liquid and exits through the walls the conduit; and calculating, on line, liquid transmission of the ultraviolet light based on a first detected value received from the first detector and a second detected value received from the second detector.

9. The method of claim 8 comprising:

adjusting operating parameters of the disinfection system based on the calculated value of the liquid transmission of the light.

* * * * *